Patented June 2, 1942

2,284,858

UNITED STATES PATENT OFFICE 2,284,858

PROCESS FOR THE MANUFACTURE OF NON-METALLIC RESISTANCE MATERIAL

Karl Biefeld, Frei-Enwalde, Oder, Germany, and Edouard Krebs, Paris, France

No Drawing. Application February 10, 1939, Serial No. 255,784. In Germany November 29, 1937

9 Claims. (Cl. 201—76)

The present invention relates to the production of non-metallic resistance materials, which are manufactured from complex heavy metal oxygen compounds by sintering.

One object of the invention is to bring the material to be sintered into moldable condition, without adding thereto any organic binders or lubricants.

Another object is to produce moldable masses containing a binder of the same chemical composition as the elementary mass to be sintered.

A further object of the invention is to produce non-metallic resistance materials of uniform chemical structure.

A still further object is to produce resistance materials of the type set forth which have low porosity and a uniform mechanical structure and which are free of bubbles and cracks formed during drying or burning.

According to the invention, these and other objects are accomplished by admixing to an elementary mass including at least one complex heavy metal oxygen compound in crystalline form, as a binder a quantity of an inorganic colloidal mass comprising the components of said complex compound in the same stoicheiometrical proportions, and molding said mixture under addition of water, prior to the sintering step.

The complex heavy metal oxygen compounds from which resistance materials are sintered, are not found naturally in colloidal form. It is, therefore, necessary to provide special steps for the preparation of the inorganic colloidal mass to be used as a binder.

According to one embodiment of the invention, the colloidal mass is produced by wet grinding a suitable quantity of the crystalline elementary mass. An alkaline salt solution may be added to the material as an electrolyte in order to facilitate breaking up of the crystalline particles into the colloidal state. The alkaline salt may be added, for instance, in the form of a soda solution which is used for wet grinding.

Preferably, however, the electrolyte is selected from the salts of the metals forming components of the complex heavy metal oxygen compound forming the elementary mass. Thus, if the elementary mass consists of ferro-aluminate, aluminum- and iron salts may be used. As compared to pure alkaline salts the metal salts in question are of greater efficiency in breaking up the particles of a mass containing components akin to their bases. Moreover, the metal salts need not be eliminated in burning, as the oxides of their bases will form component parts of the resistance mass itself and reduce the porosity of the latter.

If the colloidal mass is prepared by grinding, a considerable amount of grinding work is required. This work may be completely eliminated or at least greatly reduced, if a precipitation from a solution is included into the preparation of the colloidal mass.

In some cases, the complex metal oxygen compounds forming the elementary mass can be obtained directly in a state of very fine division in this manner. Zinc-ferrite and cadmium ferrite, for instance, can be precipitated from salt solutions directly in a state of fine division approaching colloidal condition. If necessary, the precipitate r ay be subjected to a subsequent wet grinding step.

According to another embodiment of the invention, which can be used even if direct precipitation of the complex compound is impracticable, the binder is obtained by precipitating finely divided simple compounds containing the components of the complex compounds forming the elementary mass. The compounds obtained according to this modification are usually the oxyhydrates corresponding to the metal oxides of the complex compounds, said oxyhydrates being precipitated from salt solutions by means of alkaline lye.

The oxyhydrates are usually obtained in a state of fine distribution approaching colloidal condition. Wherever necessary, an additional grinding step will serve to transform the mass entirely into colloidal condition. The amount of metal salts to be used in the salt solutions are determined by simple stoicheiometrical calculations in order to obtain a colloidal mass comprising the metal components in the same quantitative proportions, as they are present in the complex metal oxygen compound forming the elementary mass.

If the elementary mass consists, e. g., of ferroaluminate, solutions of iron—and aluminum—salts may be used to produce the colloidal mass by precipitating the iron- and aluminum oxyhydrates from the solutions by means of alkaline lye. The colloidal mass thus produced is then mixed with the elementary mass, and the mixture is molded and burned at a correspondingly high temperature, whereby the oxyhydrates combine under liberation of oxygen into ferro-aluminate equal to that forming the elementary mass.

It is known to use alkaline salts as fluxes for the combination of simple oxides into complex compounds. In the process described, alkaline salts are produced when the oxyhydrates are precipitated from the metal salt solutions. These alkaline salts may be retained in the colloidal mass by partly evaporating the solutions after precipitation of the oxyhydrates without separation of the precipitates. The thickened solution containing the oxyhydrates and the alkaline salts is stirred with the elementary mass into a moldable paste. During the subsequent sintering step, the alkaline salts volatilize after having assisted the oxyhydrates in reacting with each other and in sintering together with the elementary mass.

The relative proportions between the elementary mass containing the complex heavy metal compounds in crystals of fractions of a grain and the colloidal mass must be determined in each individual case dependent upon whether the mass is to be molded by pressing, drawing or casting. Frequently, it is desirable to admix to the elementary mass in addition to the colloidal mass a certain quantity of a fine mass comprising the same complex heavy oxygen metal compounds as the elementary mass in a somewhat finer state. The fine mass may be obtained for instance by precipitating the complex substance forming the elementary mass after sintering in a salt bath.

Example I

A moldable mixture is formed from the following components.

(1) *Elementary mass.*—Ferro-aluminate in fractions of a grain.

(2) *Fine mass.*—Ferro-aluminate precipitated from a salt bath.

(3) *Colloidal mass.*—Ferro-aluminate ground with soda-solution (1:20). Instead of soda solution, a mixed solution of sodium with aluminum- and ferric chloride may be used.

The components 1 to 3 are thoroughly mixed, the mixture is molded and burned.

Example II

Instead of the components described in Example I, the following components may be used:

(1) *Elementary mass.*—Zinc-ferrite in fractions of a grain.

(2) *Fine mass.*—Zinc-ferrite obtained by heating a mixture containing the powdered components in the stoicheicmetrical proportion of $ZnO.Fe_2O_3$ to a temperature between 960 and 1020° C. The mixture of the powdered components may also be used as fine mass without heating.

(3) *Colloidal mass.*—A mixture of zinc- and iron oxyhydrates obtained by mixing zinc- and ferric chloride in the stoicheiometrical proportion of $ZnCl_2.2FeCl_3$, dissolving the mixture and precipitating the oxyhydrates from the solution with an amount of alkaline lye calculated to avoid redissolution.

Example III

A moldable mixture is prepared from the elementary mass and the fine mass described in Example I under addition of a

*Colloidal mass.*—Containing ferric- and aluminum oxyhydrates obtained from separate precipitations of ferro-chloride and aluminum chloride in the stoicheiometrical proportion of $FeCl_3.2AlCl_3$ from their solutions with alkaline lye. The aluminum oxyhydrate is precipitated with ammonia water to avoid redissolution.

The obtained oxyhydrates are mixed with each other and with the elementary mass and the fine mass.

Instead of the iron oxyhydrates the stoicheiometrically equivalent amount of red ferric oxide $Fe_2O_3$ in finest pulverization may be used.

As mentioned above, the quantitative proportions of the elementary mass, the fine mass and the colloidal mass in the mixture are to be chosen in accordance with the manner in which the mixture is to be molded.

The following proportions have given good results:

| For a mass to be pressed or stamped | Parts |
|---|---|
| Elementary mass | 8 |
| Fine mass | 2 |
| Colloidal mass | 1 |

| For a mass to be drawn | Parts |
|---|---|
| Elementary mass | 4 |
| Colloidal mass | 1 |

| For a mass to be cast from a suspension | Parts |
|---|---|
| Elementary mass | 20 |
| Fine mass | 5 |
| Colloidal mass | 2 |

Other proportions may be used within a wide range.

The invention may also be carried out in producing a material comprising a complex heavy metal oxygen compound by sintering a mixture comprising one component or all components of said compound entirely in a state of finest colloidal distribution.

What we claim is:

1. A process for manufacturing molded nonmetallic resistances consisting of complex heavy metal oxygen compounds, said process comprising the steps of preparing an inorganic colloidal mass comprising the components of a complex heavy metal oxygen compound suitable as resistance material in the same stoicheiometrical proportions in which they are present in said complex compound, admixing a quantity of said colloidal mass as a binder to a non-colloidal elementary mass comprising the components of the same complex heavy metal oxygen compound in the same stoicheiometrical proportions, molding the mixture to the desired shape, and sintering the molded mixture.

2. A process for manufacturing molded nonmetallic resistances consisting of complex heavy metal oxygen compounds, said process comprising the steps of preparing an inorganic colloidal mass comprising the components of a complex heavy metal oxygen compound suitable as resistance material in the same stoicheiometrical proportions in which they are present in said complex compound, admixing a quantity of said colloidal mass as a binder to an elementary mass including the same complex heavy metal oxygen compound in crystalline form, molding the mixture to the desired shape, and sintering the molded mixture.

3. A process, as claimed in claim 2, in which said colloidal mass is admixed to said elementary mass in a proportion between about 10% and about 25%.

4. A process, as claimed in claim 2, in which the preparation of said colloidal mass includes wet grinding.

5. A process, as claimed in claim 2, in which the preparation of said colloidal mass includes wet grinding with the solution of an electrolyte selected from the salts of the metals forming the components of said complex compound.

6. A process, as claimed in claim 2, in which said colloidal mass comprises said complex compound in colloidal condition.

7. A process, as claimed in claim 2, in which said colloidal mass comprises a plurality of simple compounds in colloidal condition, each of said simple compounds including one component of said complex compound.

8. A process for manufacturing non-metallic resistances consisting of complex heavy metal oxygen compounds, said process comprising the steps of preparing a plurality of simple compounds in colloidal condition each of said compounds including one component of a complex heavy metal oxygen compound suitable as resistance material, the preparation of said colloidal compounds including a wet precipitation of at least one of said simple compounds, admixing said colloidal simple compounds in the stoicheiometrical proportions in which their components are present in said complex compound to an elementary mass including the same complex heavy metal oxygen compound in crystalline form, molding the mixture to the desired shape, and sintering the molded mixture.

9. A process, as claimed in claim 8, in which at least one of said simple compounds is precipitated in finely divided partly colloidal condition and is transformed into completely colloidal condition by wet grinding.

KARL BIEFELD.
EDOUARD KREBS.